United States Patent [19]
Yonezawa

[11] Patent Number: 5,461,490
[45] Date of Patent: Oct. 24, 1995

[54] METHOD OF AND APPARATUS FOR CONVERTING IMAGE SIGNALS REPRESENTING A PLURALITY OF ORIGINALS

[75] Inventor: Yasuharu Yonezawa, Kyoto, Japan

[73] Assignee: Dainippon Screen Mfg. Co., Ltd., Japan

[21] Appl. No.: 172,591

[22] Filed: Dec. 21, 1993

[30] Foreign Application Priority Data

Dec. 25, 1992 [JP] Japan ................... 4-358193
Nov. 17, 1993 [JP] Japan ................... 5-312700

[51] Int. Cl.$^6$ ................................. H04N 1/40
[52] U.S. Cl. ................ 358/445; 358/465; 358/464
[58] Field of Search ................... 358/445–448, 358/467–468, 462, 464, 465; 382/36

[56] References Cited

U.S. PATENT DOCUMENTS

| | | | |
|---|---|---|---|
| 4,369,471 | 1/1983 | Hirata | 358/280 |
| 4,514,767 | 4/1985 | Kubota et al. | 358/465 |
| 4,562,486 | 12/1985 | Suzuki et al. | 358/464 |
| 4,578,712 | 3/1986 | Matsunawa | 358/464 |
| 5,062,144 | 10/1991 | Murakami | 358/464 |
| 5,065,257 | 11/1991 | Yamada | 358/464 |
| 5,115,478 | 5/1992 | Sugiura | 358/465 |
| 5,243,668 | 9/1993 | Kitamura et al. | 358/465 |
| 5,274,469 | 12/1993 | Small et al. | 358/445 |
| 5,359,430 | 10/1994 | Zhang | 358/465 |

*Primary Examiner*—Stephen Brinich
*Attorney, Agent, or Firm*—Ostrolenk, Faber, Gerb & Soffen

[57] ABSTRACT

Sample areas are designated in a plurality of original images. Histograms representing density distribution for each color component are generated on the basis of the density signals for respective sample areas. Representative average density values in highlight-side and shadow-side in respective sample areas are determined from the histograms. A weighted average of respective representative average density values for the sample areas is calculated to obtain representative density values commonly applicable to the plurality of originals. The difference between the representative density values and the respective representative average density values are calculated, and, if the differences are within a predetermined range, reference density values for each color component are obtained on the basis of the common representative density values. The reference density values are used to define color separation rules common to all of the originals.

19 Claims, 12 Drawing Sheets

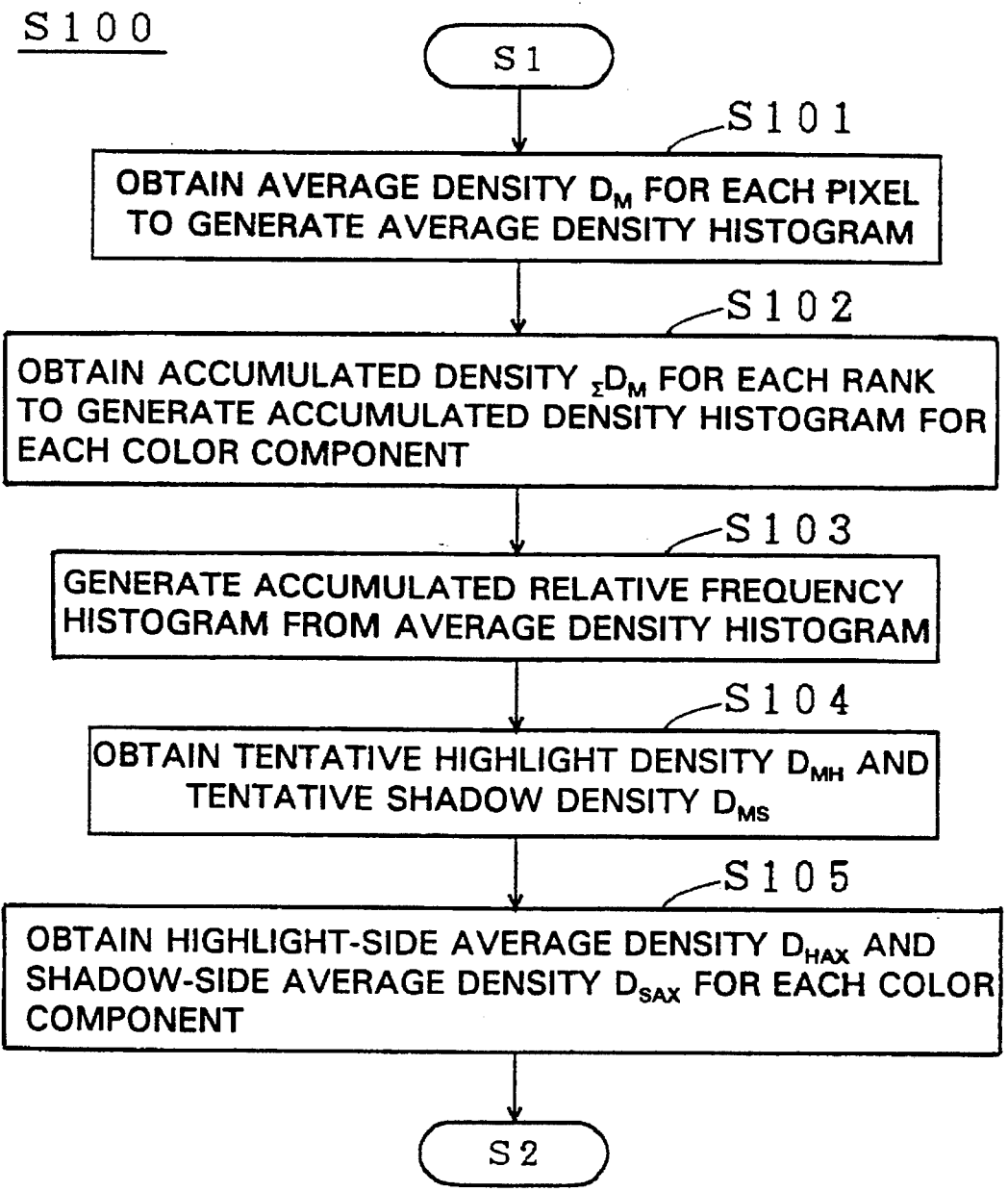

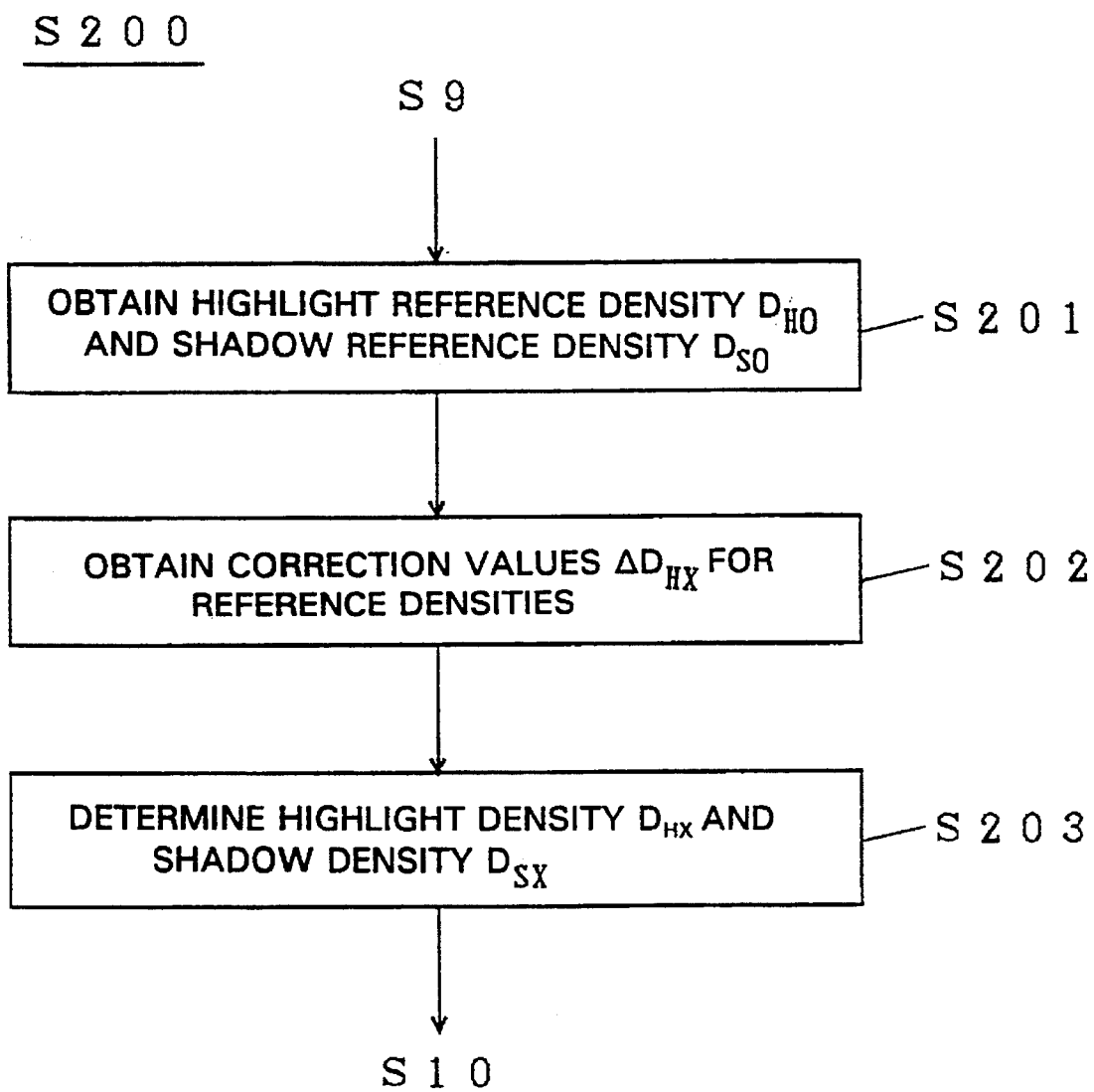

$D_{Mmin}$ : MINIMUM DENSITY
$D_{Mmax}$ : MAXIMUM DENSITY
$R_{NH}, R_{NS}$ : ACCUMLATED FREQUENCY OF DENSITY

METHOD OF AND APPARATUS FOR CONVERTING IMAGE SIGNALS REPRESENTING A PLURALITY OF ORIGINALS

BACKGROUND OF THE INVENTION

1. Field of Invention

The present invention relates to a method of determining a color separation rule employable in an image processor such as a process scanner and an apparatus for converting image signals of a plurality of originals, and in particular, relates to determination of a signal-conversion characteristic defining a color separation rule employable in an image processor such as a process scanner.

2. Description of Prior Arts

A process color scanner which is disclosed in the U.S. Pat. No. 4,679,095, for example, is known in the field of image processors for obtaining halftone dot images (reproduced images) from original images. As shown in FIG. 14, the conventional process color scanner comprises an image scan reader 101, an image processing unit 102, an image scan recorder 103, a display device 104 and a data processor 105.

The image scan reader 101 reads the image of an original (not shown) mounted on an input drum (or an original table).

The image processing unit 102 comprises: a look-up table memory for storing a normalizing curve therein; a color computer for converting the Blue, Green and Red (R, G, B) components of image data into Yellow, Magenta, Cyan and Black (Y, M, C, K) components; and other circuits. The image processing unit 102 is operable to obtain input image data from the image scan reader 101 and to convert the input image data into output image data through the look-up table memory and the color computer. The normalizing curve defines a conversion characteristic for converting the range of the input image data or signals into a range appropriate to image recording by the image scan recorder 103.

The image scan recorder 103 comprises a dot generator for receiving the output image data from the image processing unit 102 and converting the same into halftone dot signals. In response to the halftone dot signals, a halftone dot image is recorded through photo-scan of a photosensitive material which is mounted on an output cylinder or is linearly moved.

The display device 104 has a CRT display, on which an image expressed by the output image data having been processed in the image processor 102 is displayed.

The data processor 105 comprises a console, a CPU, a memory and the like, and is operable to generate the normalizing curve to be set in the look-up table memory in the image processor 102 on the basis of the input image data obtained by the image scan reader 101. The data processor 105 can correct the normalizing curve and designate regions on the image displayed on the CRT of in the display device 104 in response to manual operation of the console.

According to a conventional technique for determining the normalizing curve in the image processor, an operator designates points on the original image to determine a highlight point and/or a shadow point, which will be hereinafter referred to as "reference density point(s)". The reference points are points through the normalizing curve passes, such density levels of the pixels corresponding to the points are converted into predetermined levels.

FIG. 13 depicts an example of the normalizing curve. In the depicted example, the normalizing curve C is a straight line passing through two reference pints, i.e., a highlight point HL and a shadow point SD, which are provided on a coordinate plane defined by a horizontal axis representing input signals $D_X$ (X=B, G, R) and a vertical axis representing normalized density signals $D_{NX}$ (X=B, G, R).

The values $D_{NX}$ and $D_{NH}$ for the normalized density signals $D_{NX}$ are values common to all color components. The value $D_{HX}$ for the input signals is a highlight density value for each color component B, G, R, and the value $D_{SX}$ is a shadow density value for each color component B, G, R. The coordinates of the highlight point HL and a shadow point SD are $(D_{HX}, D_{NH})$ and $(D_{SX}, D_{NS})$, respectively. Accordingly, each input signal $D_X$ is converted by the normalizing curve C connecting the two points, whereby the normalized density signal $D_X$ which is in the range defined between the values $D_{NH}$ and $D_{NS}$. The normalizing curve C is determined for each color component B, G, R to normalize each color component B, G, R, whereby an optimum color separation rule is obtained.

For the case where a plurality of original images are exposed on photo-films of a same type or under same conditions, which is the case where a plurality of original images are prepared at a same time for making a catalog of goods, for example, it is preferable that the plurality of original images are color-separated according to a same color separation rule to unify the respective tones of recorded images of respective original images. A conventional technique to determine a uniform or common color-separation condition such that a typical one of the plurality of original images is selected by an operator and color-separation condition is determined for the selected one original image in accordance with the process described above. The color separation rule thus determined is applied to color-separation of respective original images.

The conventional technique in which an operator selects one original image and the color-separation rule based only on the selected one original image is applied to respective original images has the following disadvantages:

(1) The selection of typical one image within a plurality of original images requires a skill fill operator and tends to reflect differences among individuals. Accordingly, it is difficult to always obtain desirable color separation rules.

(2) A plurality original images to be recorded sometimes include images in which color tones are deviated to highlight sides or shadow sides. Thus, it is unreasonable to apply a color-separation rule based only one original to all original images for all cases.

SUMMARY OF THE INVENTION

The present invention is directed to a method of converting image signals representative of a plurality of original images into converted image signals adapted to a predetermined image processing.

According to the present invention, the method comprising the steps of: a) obtaining a plurality of parameter signals depending on density distributions of the plurality of original images, respectively; b) averaging the plurality of parameter signals to obtain an averaged signal; c) generating a common parameter signal common to the plurality of original images in response to the averaged signal; d) generating a common signal-conversion characteristic in response to the common parameter signal; and e) converting each of the image signals through the signal-conversion characteristics to obtain the converted image signals, respectively.

Since the common signal-conversion characteristic is obtained by averaging the plurality of parameter signals determined for the plurality of originals, it is not required for operators to select a specific original image to determine the common signal-conversion characteristic. Accordingly, the process of determining the common signal-conversion characteristic is easily atomized, and desirable signal conversion can be always attained.

Preferably, respective weights of the plurality of parameter signals are determined and a weighted average of the plurality of parameter signals using the weight signals is obtained. A weighted average signal representative of the weighted average is generated to thereby obtain the averaged parameter signal.

The common signal-conversion characteristic can be obtained by designating the weights according to a priority order of the plurality of objective originals. The common signal-conversion characteristic reflects the operator's intention.

In an aspect of the present invention, difference signals representative of differences between the common parameter signal and respective ones of the parameter signals arc generated. The difference signals is compared with a threshold signal, and a warning signal is generated when at least one of the plurality of parameter signals is deviated from a difference range defined by the threshold.

In response to the warning signal, the operator may change the respective parameter signals to obtain an optimum signal-conversion characteristic.

The present invention also provide an apparatus adapted to the present method.

Accordingly, an object of the present invention is to convert image signals representative of a plurality of originals through a signal-conversion characteristic which is common to respective image signals and is independent of operator's skill.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a flowchart showing data processing in the process step S100 of FIG. 3;

FIG. 5 is a flowchart showing data processing in the process step S120 of FIG. 3;

DESCRIPTION OF PREFERRED EMBODIMENTS

<A. Overall Structure and Operation of Process Scanner>

Figure 1:
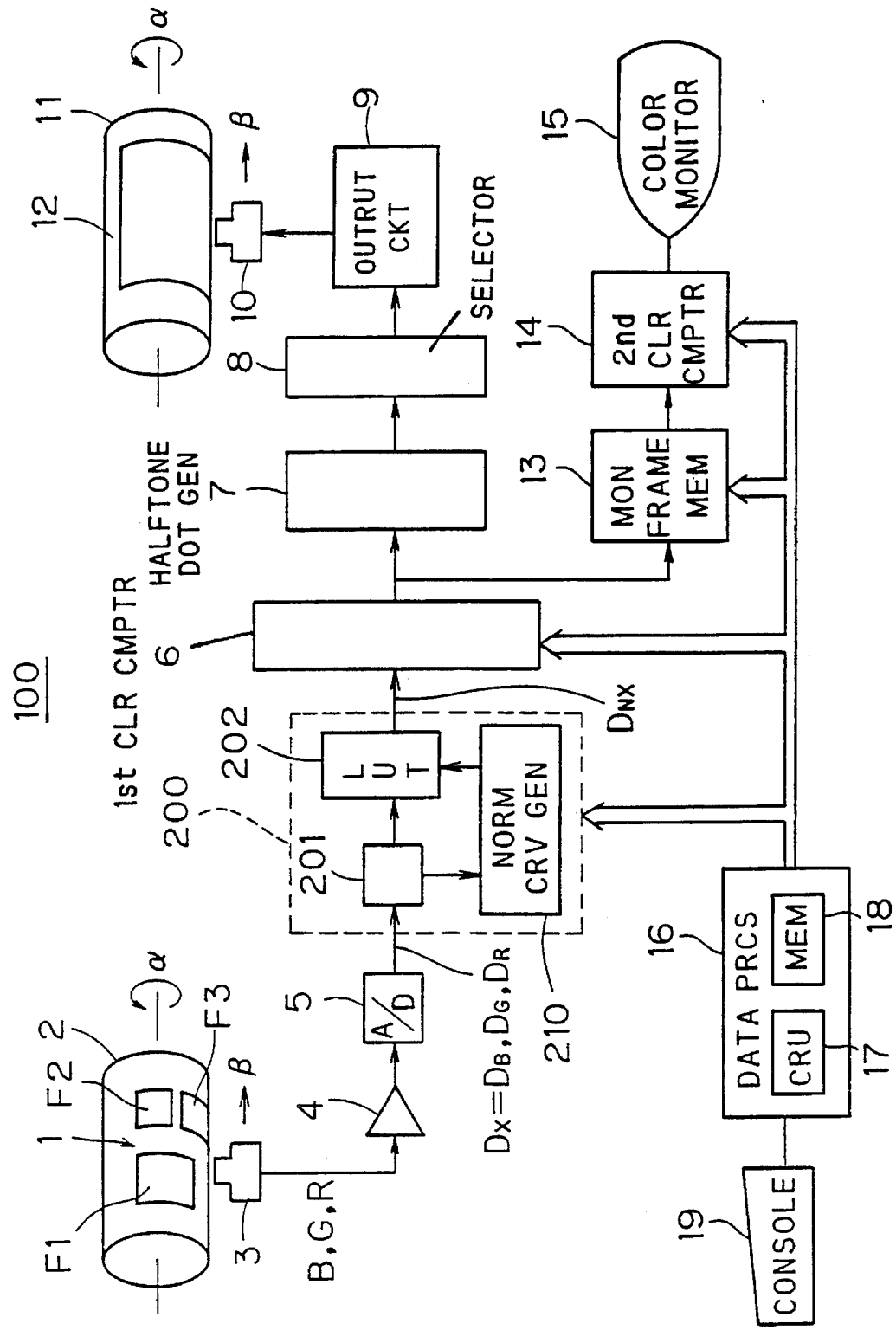
FIG. 1 is a block diagram showing a color process scanner according to a preferred embodiment of the present invention.

FIG. 1 is a block diagram showing the overall structure of a process color scanner 100 according to a preferred embodiment of the present invention.

A plurality of color original films F1, F2 and F3 serving as originals are wound around an original drum 2 and a pickup head 3 facing to the original drum 2 is provided. Main scannings and subscannings are attained by rotation of the original drum 2 in the direction (a main scanning direction) α and translation of the pickup head 3 in the direction (a subscanning direction) β, respectively. The color images on the original films F1, F2 and F3 are photoelectrically read by the pickup head 3 for each pixel according to the order of scanning lines, to obtain color image signals.

The image signals representing respective density for each pixel of images on the original films F1, F2 and F3 are converted into logarithm signals by logarithm converter 4 for each color component of blue (B), green (G) and red (R), and then, are further converted into digital density signals $D_B$, $D_G$ and $D_R$ in an A/D converter 5.

A density signal $D_X$ obtained for each color component are delivered to a normalizing converter 200, where the suffix "X" represents X=B, G, R. (It is to be noted that all symbols having the suffix "X" which will appear in the following description should be read as X=B, G, R.)

The normalizing converter 200 comprises a switching circuit 201, a normalizing curve generator 210 and a look-up table (LUT) 202. In a prescanning step, the switching circuit 201 connects its input to the normalizing curve generator 210. The normalizing curve generator 210 determines a common color separation rule (high light density values and shadow density values) on the basis of density values (the density signals $D_X$) of each pixel and frequency of densities appearing on the original films F1, F2 and F3 according to a method described later, to thereby obtain a normalizing curve such as the curve or line shown in FIG. 13. The data representing the normalizing curve is loaded to the LUT 202 in the form of numerical data for each color component.

In a regular scanning step, the switch circuit 201 opens the connection to the normalizing curve generator 210 and closes the connection to the LUT 202. The density signals $D_X$ of each pixel obtained by scanning the originals again arc normalized by the data stored in the LUT 202 to become normalized density signals $D_{NX}$, which are transmitted to a first color computer 6 provided in the next stage.

The color computer 6 converts the normalized density signals $D_X$ into color component signals for Yellow (Y), Magenta (M), Cyan (C) and Black (K) blocks corresponding to respective halftone dot percentages. The color component signals for blocks are converted into Y, M, C and K halftone dot signals in a halftone dot generator 7. A selector 8 combines the halftone dot signals with each other in a time-sharing form and the resultant combined signals are outputted to an output circuit 9.

The recording head 10 comprises a laser source therein and modulates a laser beam in a binary form, i.e., ON and OFF, in response to a modulation signals which are the combined signals inputted. A photosensitive film 12 is wound around a recording drum 11. In synchronism with rotation of the recording drum 11 in a direction (a main scanning direction) α and translation of the recording head 10 in a direction (subscanning direction) β, the laser beam exposes the photosensitive film 12 for each pixel in the order of scanning lines to record color component images for Y, M, C and K on respective areas of the photosensitive film 11.

In both of the prescanning and the regular scanning, the color component signals for Y, M, C and K blocks are stored in a monitor frame memory 13 for each pixel, and then, converted back to B-, G- and R-color component signals in a second color computer 14 to be displayed on a color monitor device 15. An operator can observe the processed color image on the display device to monitor the result of the image processing in the normalizing converter 200 and the first color computer 6 while operating the process scanner.

A data processor 16 is provided with a CPU 17 and a memory 18 storing system programs, which are operable to control the respective operations of the normalizing converter 200, the first color computer 6, the monitor frame memory 13 and the second color computer 14. A console 19 is used for inputting commands and data through manual operation thereof.

The following description is directed to the example where the process scanner records positive images for Y-, M-, C- and K-color components on the photosensitive film 21.

<B. Construction and Operation of Normalizing Curve Generator>

Figure 2:
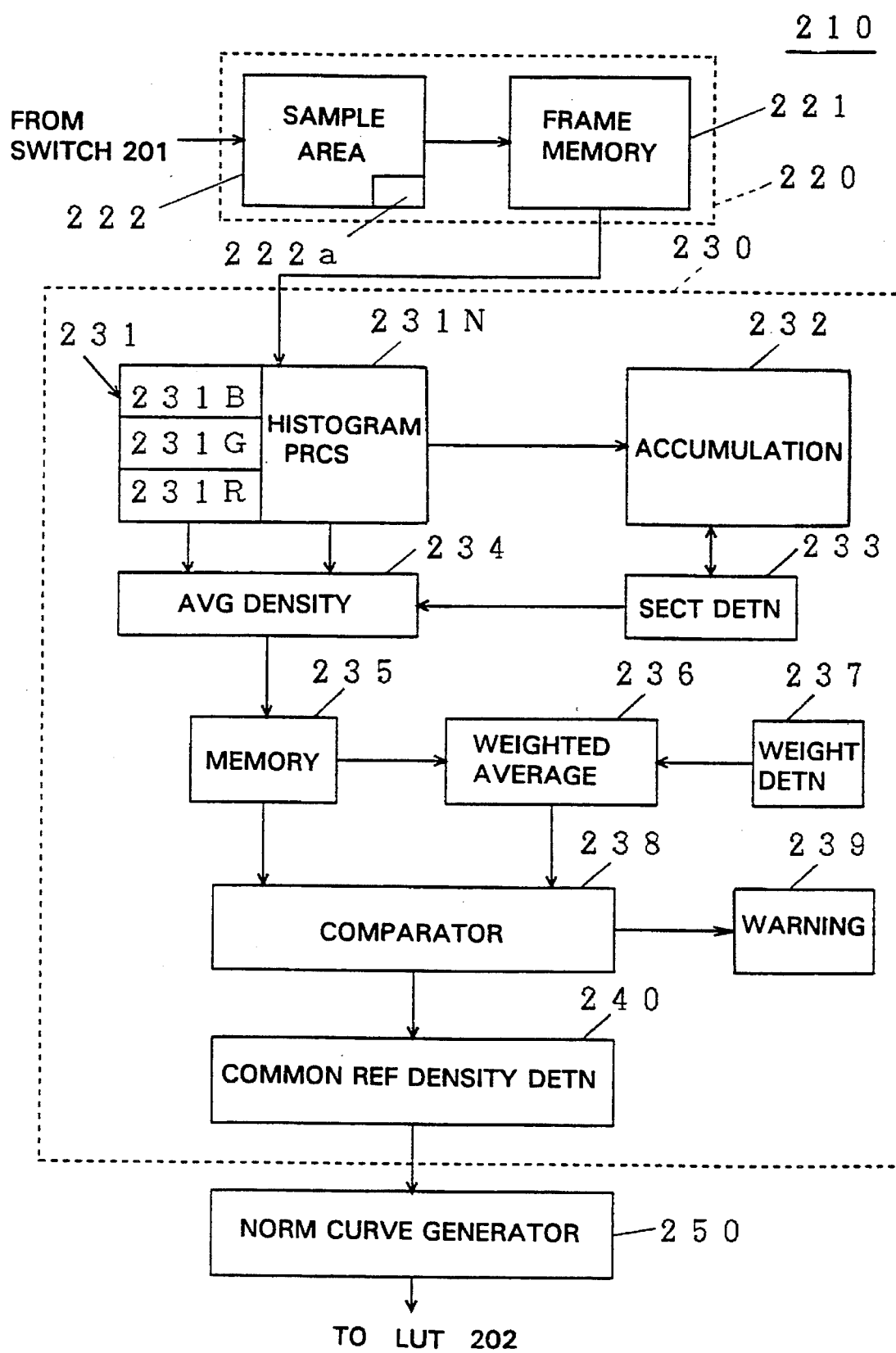
FIG. 2 is a block diagram showing a normalization curve generator provided in the scanner of FIG. 1.

FIG. 2 is a block diagram showing the structure of the normalizing curve generator 210 in the normalizing converter 200 according to the preferred embodiment of the present invention. The normalizing curve generator 210 comprises an input portion 220, a color separation rule generating portion 230 and a normalizing curve generating portion 250. Details of these portions will be described with the operation of generating normalizing curves shown in the flowcharts of FIGS. 3, 4 and 5.

<B-1. Generation of Common Color Separation Rules>

As a first step of generating color separation rules commonly applied to respective original images on the original films F1, F2 and F3, signals expressing representative average density values of the original images F1, F2 and F3, which are parameters of individual color separation rules, are generated on the basis of respective density distribution characteristics on the original films F1, F2 and F3. The signals expressing representative average density values are averaged to obtain the common color separation rules. Details of the process are as follows:

<B-1-1. Calculation of Representative Density Values $D_X$>

The image signals obtained by the prescanning are converted into the digital image signals $D_X$ by the logarithm converter 4 and the A/D converter 5 (FIG. 1), as described above. The digital image signals $D_X$ are transmitted to a frame memory 221 (FIG. 2), which is provided in the input portion 220, through the switching circuit 201. The digital image signals $D_X$ are stored in the frame memory 221 for each color component of B, G, R and each pixel (the process step S1 of FIG. 3).

If the total size of the original films F1, F2 and F3 are large, the storage of the density signals $D_X$ in the frame memory 221 is conducted while skipping pixels in the density signals $D_X$.

Figure 6:
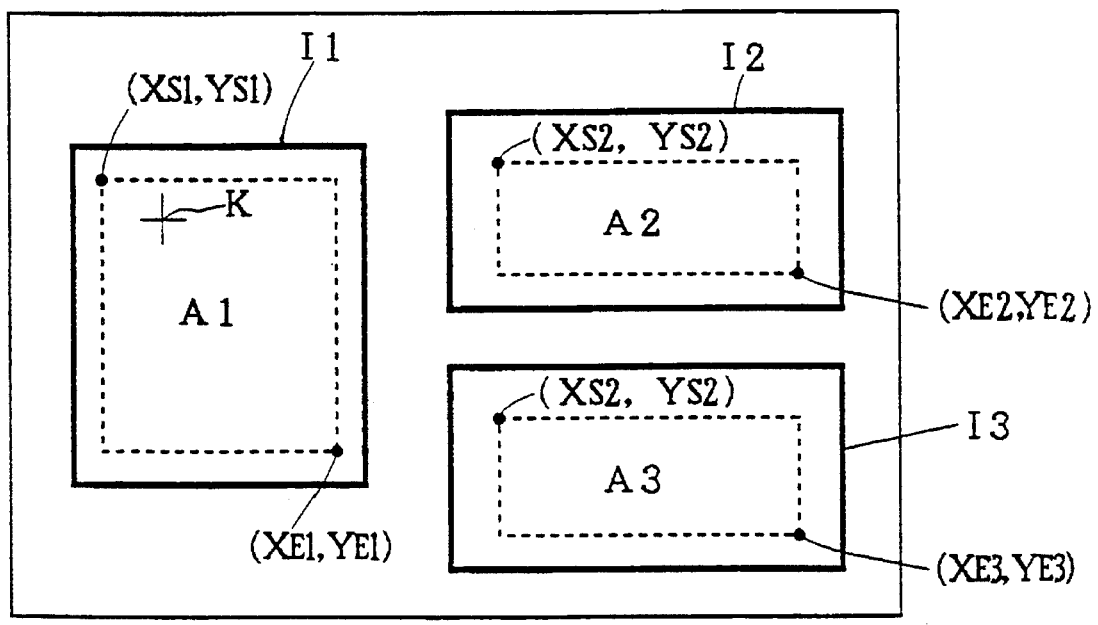
FIG. 6 is a diagram showing sample areas determined on a plurality of original images data.

Next, a sample-area determining portion 222 determines respective sample areas to be analyzed on the original films F1, F2 and F3, which are objective areas analyzed to determine color separation rules of the original films F1, F2 and F3 (the process step S2). The sample areas are rectangular areas determined by designating the coordinates of respective ends of a diagonal line of each rectangle. For example, suppose that images I1, I2 and I3 on the original films F1, F2 and F3 are displayed on the color monitor 15 in the prescanning step, as illustrated in FIG. 6. For each image I1, I2, I3, the operator operates the console 16 while monitoring a cursor K to designate two points which are the left-top apex $(X_{Sj}, Y_{Sj})$ and the right-bottom apex $(X_{Ej}, Y_{Ej})$ of a rectangular region to be employed as sample area, where j=1, 2, 3. As a result, sample areas $A_j$ (j=1, 2, 3) surrounded by broken lines in FIG. 6 are determined in the images I1, I2 and I3 by the sample-area determining portion 222.

In the next process step S3, the value "1" is set for a count value j of a counter 222a provided in the sample-area determining portion 222 and the density signal $D_X$ of each pixel included in the pixel group on the sample area $A_1$ are transmitted to the color separation rule generating portion 230.

Figure 7:
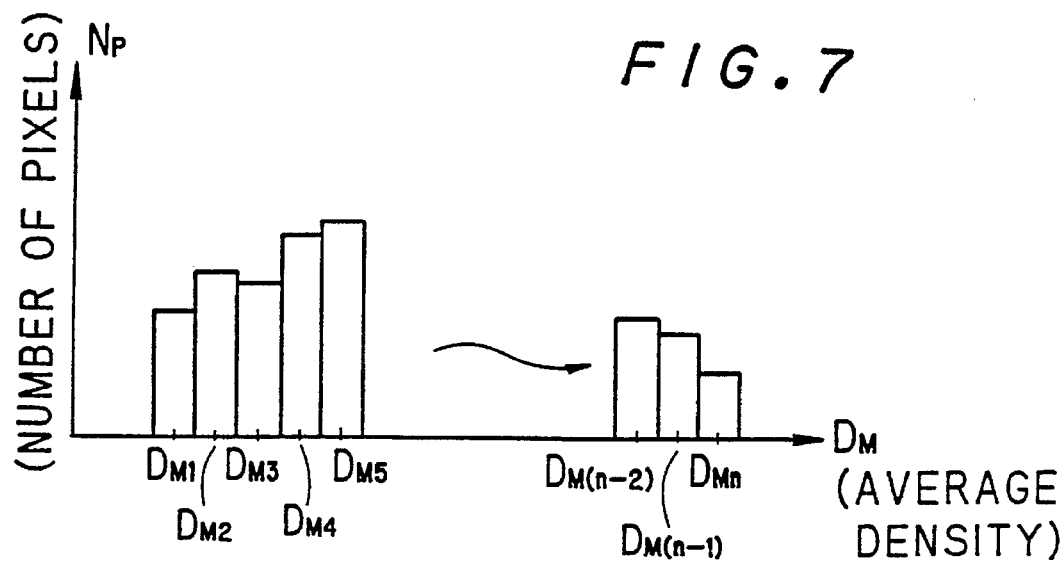
FIG. 7 is a diagram showing an example of an average density value histogram.

The next process step S100 is a subroutine for obtaining highlight-side average density values $D_{HAX}$ and shadow-side average density values $D_{SAX}$ for the sample area $A_j$ determined by the sample-area determining portion 222. The values $D_{HAX}$ and $D_{SAX}$ represent the density distribution character of the sample area $A_j$ and are hereinafter referred to as "representative average density values $D_{AX}$" in general. The representative average density values $D_{AX}$ may be determined as follows:

FIG. 4 is a flowchart illustrating the details of the process step S100. In the process step S101, a histogram processing portion 231 (FIG. 2) calculates an average density value $D_M$ according to the formula: $D_M=(D_B+D_G+D_R)/3$ for each pixel serially transmitted from the input portion 220. The calculation is conducted for the density values of all pixels transmitted from the input portion 220. An average density histogram generator 231N generates signals representative of an average density histogram for each color component on a histogram plane defined by an abscissa representing respective ranks of the average density and an ordinate representing the number $N_X$ of pixels belonging to respective ranks. FIG. 7 depicts an example of the average density histogram obtained, where the center values (rank values) of respective ranks are indicated by the symbol $D_{Mi}$ (i=1–n).

Figure 8:
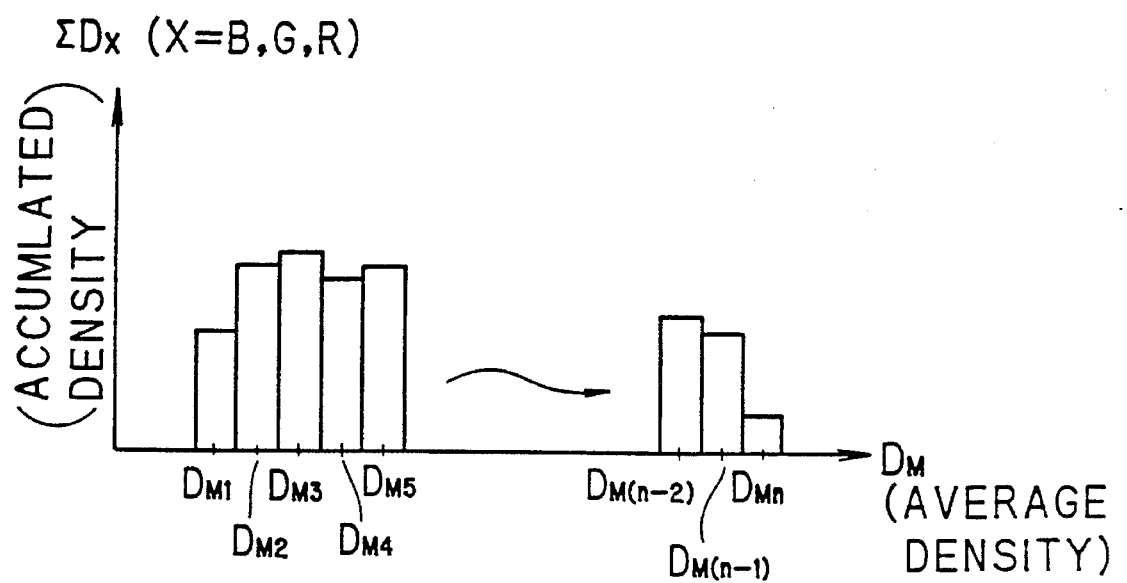
FIG. 8 is a diagram showing an example of an accumulated density value histogram.

In the process step S102, accumulated density histogram generators 231B, 231G and 231R accumulate or sum up the density signals $D_X$ for respective color components B, G and R of the pixels belonging to each rank of the average density histogram, respectively. After the accumulation, an accumulated density histogram for each color component is generated on a histogram plane defined by an abscissa representing respective rank values $D_{Mi}$ (i=1–n) and an ordinate representing the accumulated density values $\Sigma D_X$ for the pixels belonging to respective ranks. FIG. 8 illustrated an example of the accumulated histogram and such an accumulated histogram is obtained for each color component X=B, G, R. The accumulated histogram is also represented by electric signals. In an actual process, the process steps S101 and S102 may be conducted in parallel.

Figure 9:
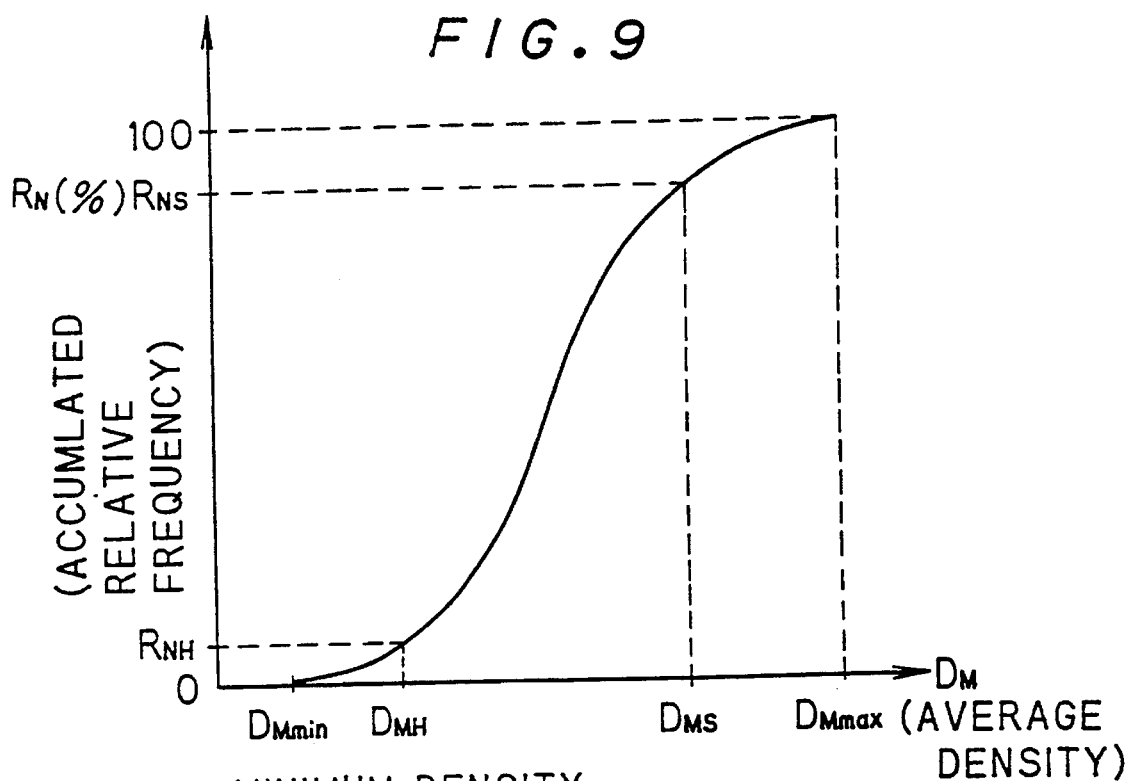
FIG. 9 is a diagram showing an example of a accumulated relative histogram of density values.

In the process step S103, an accumulation processor 232 generates signals representing an accumulated relative histogram shown in FIG. 9 from the average density histogram shown in FIG. 7. The histogram plane for the accumulated relative histogram is defined by an abscissa representing respective the rank values $D_{Mi}$ (i=1–n) and an ordinate representing relative frequencies RN (%) of pixels accumulated from the lowest density side. The accumulated relative histogram takes their values from 0% to 100% in the range from the minimum density $D_{Mmin}$ to the maximum density $D_{Mmax}$. The accumulated relative histogram illustrated in FIG. 9 is approximated by a continuous curve under the assumption that the width of each rank is sufficiently small.

Predetermined values $R_{NH}$ and $R_{NS}$ of accumulated frequency are registered in a section determining portion 233. A tentative highlight average density value $D_{MH}$ and a tentative shadow average density value $D_{MS}$ are obtained by applying the accumulated frequency values $R_{NH}$ and $R_{NS}$ to the accumulated relative histogram of FIG. 9. Data related to density sections of the highlight side and the shadow side, from which average density values are to be obtained, are generated from the tentative highlight average density value $D_{MH}$ and the tentative shadow average density value $D_{MS}$ and are delivered to an average density operating portion 234.

The accumulated frequency values $R_{NH}$ and $R_{NS}$ are previously determined as resulting optimum highlight and shadow points, which may be obtained by previously analyzing many original images. For example, the accumulated frequency values $R_{NH}$ and $R_{NS}$ are 1% and 98%, respectively.

The average density operating portion 234 averages respective density values of pixels for each color component included in the sections determined by the section determining portion. 233, whereby representative average density values $D_{AX}$ are obtained (the process step 105).

Figure 10:
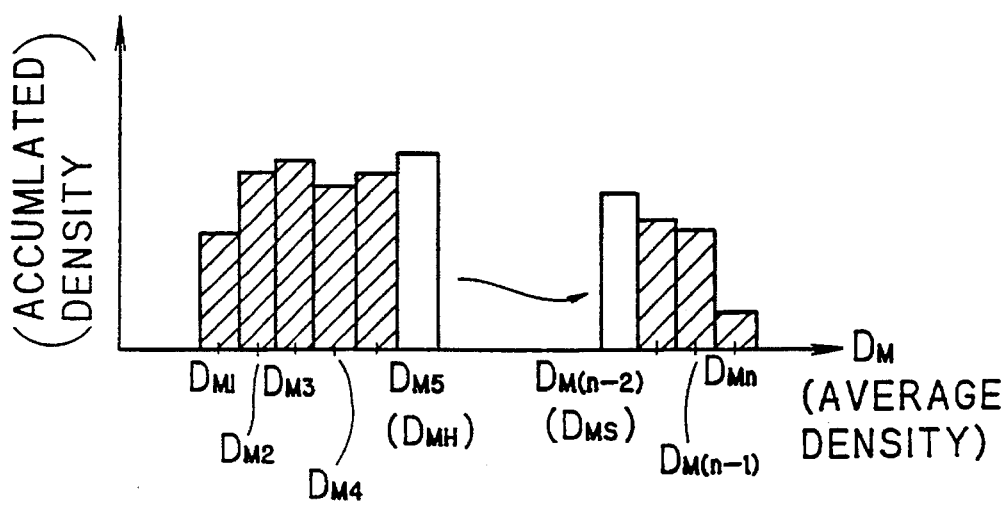
FIG. 10 is a diagram showing the process step of obtaining average densities in the density ranges in highlight and shadow side sections.

That is, the for the accumulated density histogram such as the histogram shown in FIG. 8, the accumulated density values $\Sigma D_X$ are averaged for each color component within: the density section ($D_{Mmin} \leq D_M \leq D_H$) lower than the tentative highlight average density value $D_H$ for the highlight side; and the density section ($D_{MS} \leq D_M \leq D_{Mmax}$) higher than the tentative shadow average density value $D_S$ for the shadow side, as illustrated in FIG. 10 with slanted lines.

The highlight-side average density value $D_{HAX}$ and the shadow-side average density value $D_{SAX}$ are defined by the following expressions (1) and (2):

$$D_{HAX} = \Sigma(\Sigma D_X)_H / \Sigma N_{PH} \qquad (1)$$

$$D_{SAX} = \Sigma(\Sigma D_X)_S / \Sigma N_{PS} \qquad (2)$$

where $\Sigma N_{PH}$ is the total number of pixels belonging to the density section determined for the highlight-side, $\Sigma(\Sigma D_X)_H$ is the sum of the accumulated density values for each color component in the density section determined for the highlight-side, $\Sigma N_{PS}$ is the total number of pixels belonging to the density section determined for the shadow-side, and $\Sigma(\Sigma D_X)_S$ is the sum of the accumulated density values for each color component in the density section determined for the shadow-side.

For example, if the "X" in FIG. 10 is "Blue" and the tentative highlight-side density value $D_{MH}$ is coincident with the rank value $D_{M5}$, the value $D_{HAB}$ is obtained as:

$$D_{HAB} = (\Sigma D_{M1} + \Sigma D_{M2} + \Sigma D_{M3} + \Sigma D_{M4} + \Sigma D_{M5})/(N_{P1} + N_{P2} + N_{P3} + N_{P4} + N_{P5})$$

from the expression (1), where $N_{Pi}$ (i=1–5) is the number of pixels whose average density value $D_M$ belongs to the rank $D_{Mi}$ and is easily obtained from the average density histogram of FIG. 7.

Figure 3:
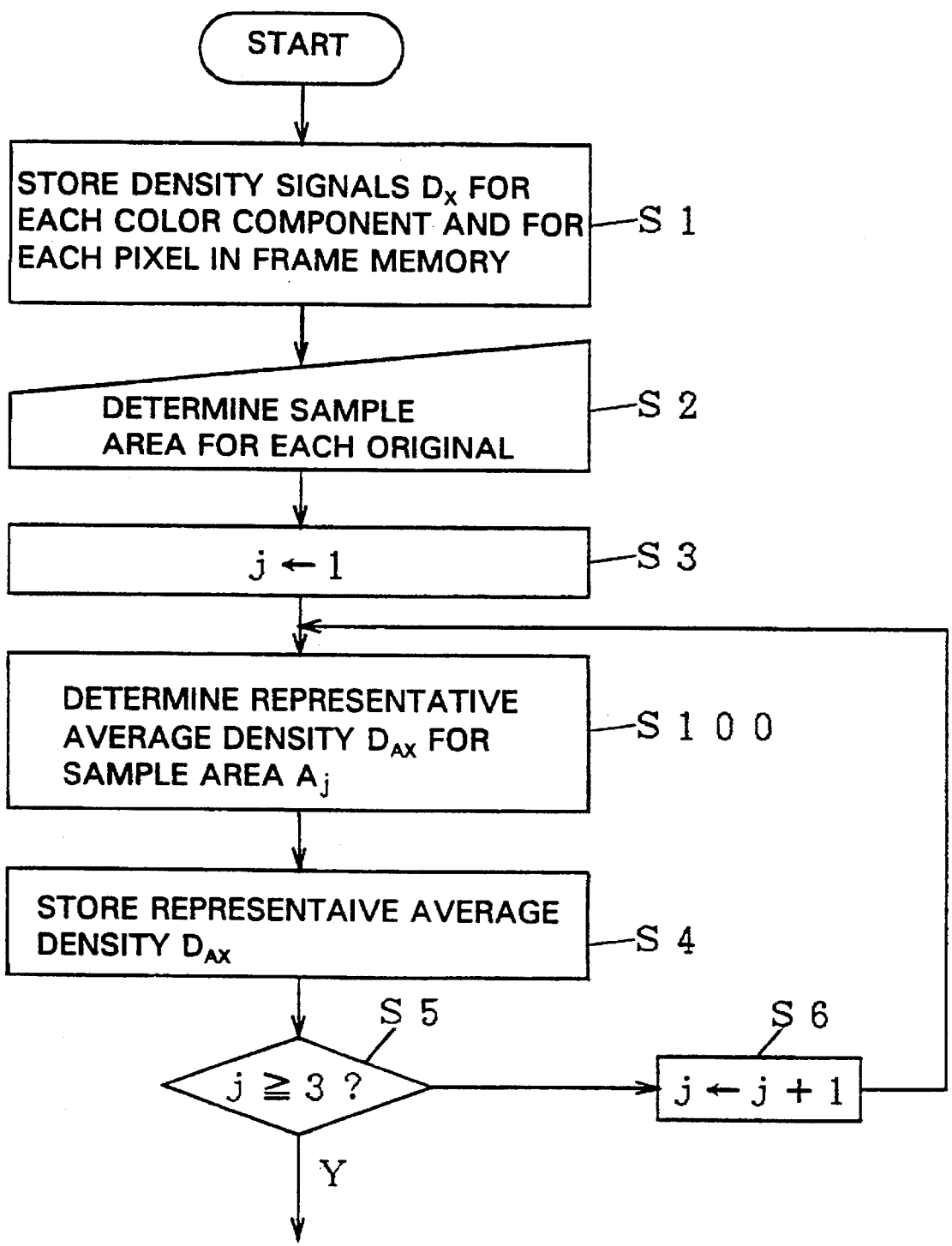
FIGS. 3 and 3A are flowchart showing an operation of a color separation rule determining portion provided in the normalization curve generator of FIG. 2.
Figure 3A:
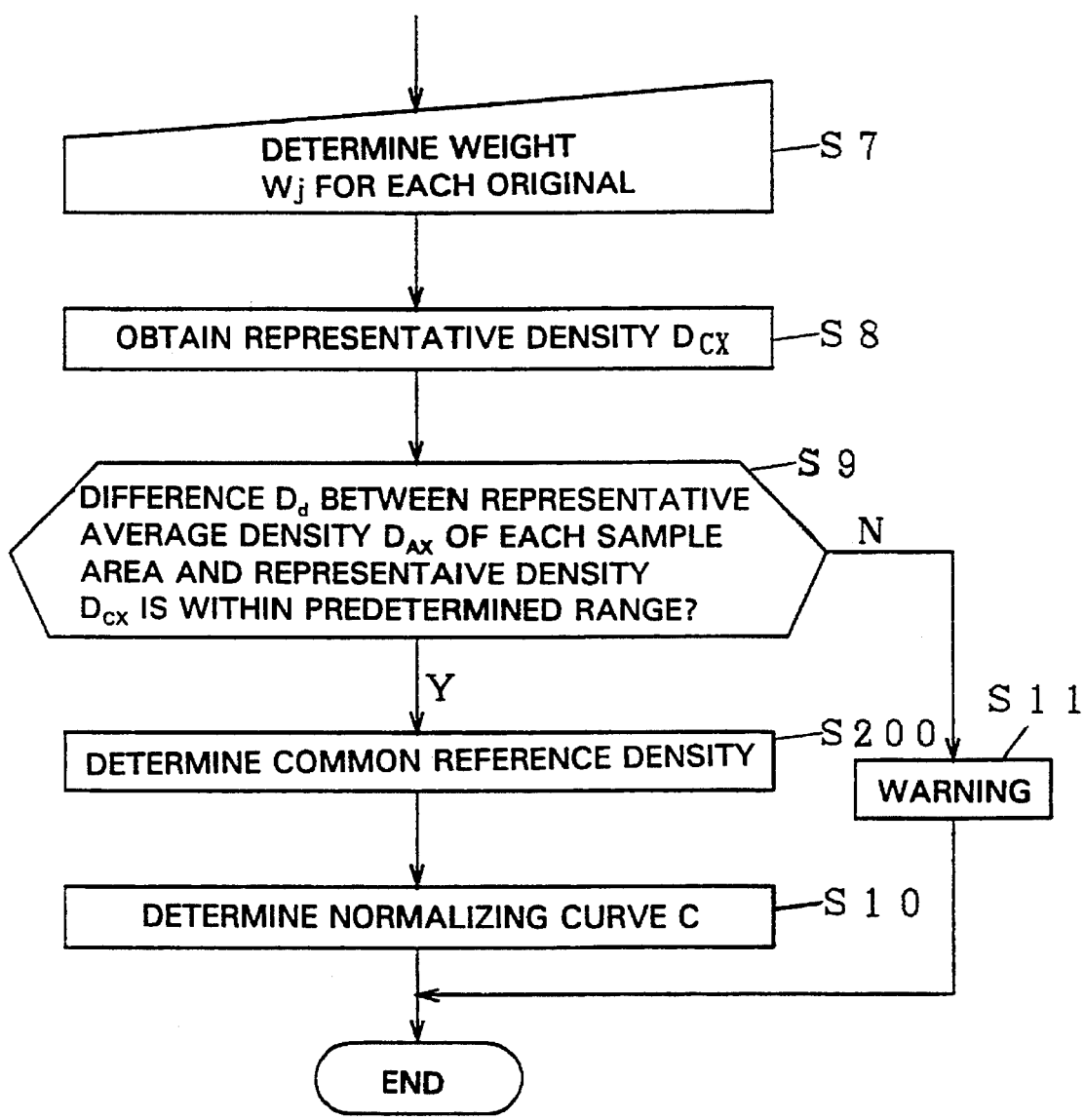

The subroutine of the process step S100 is now completed and the process returns to the main routine of FIG. 3.

In the process step S4 in FIG. 3, the representative average density value $D_{AX}$ for the sample area Aj obtained in the process step S100 is stored in a memory 235. In the process step S5, it is judged whether or not the count j of the counter 222a in the sample-area determining portion 222 is not less than "3". If the count is less than "3", the count indicates that there remain one or more sample areas $A_{(j+1)}$ having not analyzed yet and the count j is incremented by "1" in the process step S6 to perform the process step S100 for the next sample area $A_{(j+1)}$ whereby a value of the representative average density value $D_{AX}$ for the next sample area $A_{(j+1)}$.

<B-1-2. Determination of Representative Density Value $D_{CX}$>

If the count j of the counter 222a is not less than "3", in the process step S5, it is found that the representative average density value $D_{AX}$ has been obtained for all sample areas A, so that the process proceeds to the process step S7. The operator investigates what color tone is important for respective original films $F_i$ (j=1, 2, 3) to set weights for each original film $F_j$ in a weight determining portion 237. This is attained by designating weight value $W_j$ (j=1, 2, 3) for each original film $F_j$ with the console 19 and by generating signals representing the weight value $W_j$ (j=1, 2, 3).

In the process step S3, a weighted average calculator 236 calculates a weighted average of respective representative average density values $D_{AX}$ by using the following expression (3), to thereby obtain signals expressing representative density value $D_{CX}$.

$$D_{CX} = \Sigma(W_j \cdot D_{AXj}) \qquad (3)$$

where $\Sigma W_j = 1$ (j=1, 2, 3), and $D_{AXj}$: the representative average density value for each color component obtained for the sample area $A_j$.

For example, the weights $W_j$ may be determined such that $W_1=0.5$, $W_2=0.3$, and $W_3=0.2$ when the operator concluded that the color tone in the sample area $A_1$ is most important and those in the sample areas $A_2$ and $A_3$ are next important in this order. On the other hand, if the operator concluded that respective color tones in the sample areas $A_j$ are important in an even degree, the weight values may be determined as $W_1=W_2=W_3=1/3$. The latter case is equivalent to a simple average of the representative average density values $D_{AX}$ for all sample areas $A_j$.

The representative density values $D_{CX}$ are common to respective original films $F_j$ and are hardly influenced by individual skill or character of operators, so that determination of color separation rules are easily atomized.

In the next process step S9, the representative density values $D_{CX}$ obtained in the weighted average calculator 236 are compared with respective representative average density values $D_{AX}$ stored in the memory 235 and it is judged whether or not the absolute values of their differences $D_d$ (herein after referred to as "density differences") arc less than a predetermined threshold $D_L$. The comparison and judgement arc conducted in a comparator 238. The threshold $D_L$ may be different between the highlight-side and the shadow-side.

The threshold $D_L$ may be previously and experientially obtained by analyzing many original images and is a limit of the color separation rules applied to original films having predetermined density distribution character.

Accordingly, if at least one of the density differences $D_d$ between the respective representative average density values $D_{AX}$ and the representative density values $D_{CX}$ is larger than the threshold $D_L$ i.e., is deviated from the range from zero to $D_L$, it should be stopped to commonly apply the representative density values $D_{CX}$ to all of the original films F1, F2 and F3. In this case, the process returns to the process step S11 and a warning signal indicating the deviation is generated by a warning portion 239. The warning signal may be used to generate a warning message on the color monitor 15, or to generate a warning sound. The operator temporally stops determination of color separation rules in response to the warning. The selection of next process step after the warning is entrusted to the operator. The operator may try to determine color separation rules again while changing the analyzing conditions by: (1) newly determining the sample areas $A_j$ in the sample-area determining portion 222; or (2) changing the weights $W_j$ for respective original films to other weight values in the weight determining portion 237, for example, to obtain signals representing new representative density values $D_{CX}$.

If the differences $D_d$ between the new representative density values $D_{CX}$ and the respective representative average density values D also exceed the threshold $D_L$, the operator abandons to obtain common color separation rules for the objective originals and stops the routine.

<B-1-3. Determination of Reference Density Values>

If the density differences $D_d$ between the respective representative average density values $D_{AX}$ and the representative density values $D_{CX}$ are smaller than the threshold $D_L$ in the process step S9, highlight density values and shadow density values common to all original films F1, F2 and F3 are determined in the process step S200.

As already described, color separation rules are determined by obtaining a highlight density value $D_{HX}$ and a shadow density value $D_{SX}$ (herein after referred to as "reference density values") for each color component. That is, a highlight point HL and a shadow point SD (FIG. 13) on a normalizing coordinate plane are determined on the basis of the highlight density value $D_{HX}$ and the shadow density value $D_{SX}$, respectively, and a normalization curve C is so determined as to pass through the highlight point HL and the shadow point SD. The representative density values $D_{CX}$ are common to all objective original films and represent the density values on the highlight and shadow sides as a whole. Accordingly, the representative density values $D_{CX}$ themselves may be employed as highlight density values $D_{HX}$ and shadow density values $D_{SX}$ common to all objective originals. However, in the preferred embodiment of the present invention, reference density values are determined for each color component in a common reference density value determining portion 240 so that gray balance for the representative density values $D_{CX}$ is maintained, as follows:

FIG. 5 is a flowchart showing the details of the process step S200 corresponding to the determination of the reference density values. In the following description, the representative density values $D_{CX}$ are classified into highlight-side representative density values $D_{HCX}$ and shadow-side representative density values $D_{SCX}$.

First, in the process step S201, reference density values, i.e., highlight density reference value $D_{HO}$ and a shadow density reference value $D_{SO}$, commonly applicable to respective color components are determined on the basis of the highlight-side representative density value $D_{HCX}$ and the shadow-side representative density value $D_{SCX}$, respectively. The reference density values are represented by reference density signals.

In the determination of the reference density values, the highlight density reference value $D_{HO}$ is obtained by a weighted average of a standard highlight density value $D_{HF}$ and a minimum one of the highlight-side representative density values $D_{HCX}$, while the shadow density reference value $D_{SO}$ is obtained by a weighted average of a standard shadow density value $D_{SF}$ and a maximum one of the shadow-side representative density values $D_{SCX}$, for example. The standard highlight density value $D_{HF}$ and the standard shadow density value $D_{SF}$ are previously obtained as reference density values applicable to many originals.

Alternatively, the highlight density reference value $D_{HO}$ and the shadow density reference value $D_{SO}$ may be determined by weighted averages or simple averages of the highlight-side representative density values $D_{HCX}$ and the shadow-side representative density values $D_{SCX}$ for respective color components, respectively.

Next, in the process step 202, correction signals representing highlight correction values $\Delta D_{HX}$ and shadow correction values $\Delta D_{SX}$ for the reference density values are generated in accordance with the following expressions (4) and (5):

$$\Delta D_{HX} = K_H \cdot GH(D_{HCX} - D_{HO}) \quad (4)$$

$$\Delta D_{SX} = K_S \cdot GS(D_{SCX} - D_{SO}) \quad (5)$$

where $K_H$ and $K_S$ are positive constants previously determined, and the functions GH and GS are defined as:

$$GH(D_{HCX} - D_{HO}) = (D_{HCX} - D_{HO})/\{1 + ((D_{MAX} - D_{min})/A_H)^m\} GS(D_{SCX} - D_{SO}) = D_{SCX} - D_{SO}$$

where $D_{Hmax} = \text{MAX}(D_{HCB}, D_{HCG}, D_{HCR})$ $D_{Hmin} = \text{MIN}(D_{HCB}, D_{HCG}, D_{HCG})$ $A_H$: a predetermined positive constant m: a predetermined positive constant ("3", for example).

As understood from the expressions (4) to (7), the highlight correction values $\Delta D_{HX}$ and the shadow correction values $\Delta D_{SX}$ are proportional to $(D_{HCX} - D_{HO})$ and $(D_{SCX} - D_{SO})$, respectively. The value $(D_{HCX} - D_{HO})$ reflects uniform deviation of color tone in the highlight part while the value $(D_{SCX} - D_{SO})$ reflects uniform deviation of color tone in the shadow part.

In the next process step S203, signals representing the highlight density value $D_{HX}$ and the shadow density value $D_{SX}$ for each color component are generated from the reference density signals $D_{HO}$ and $D_{SO}$ and the correction signals $\Delta D_{HX}$ and $\Delta D_{SX}$ according to the following expressions (8) and (9):

$$D_{HX} = D_{HO} + \Delta D_{HX} \quad (8)$$

$$D_{SX} = D_{SO} + \Delta D_{SX} \quad (9)$$

The highlight density value DX and the shadow density value $D_{SX}$ thus obtained for each color component are reference density values not only common to the all original films F1, F2 and F3 but also effective to suppress uniform color deviation of color tone and maintain gray balance.

<B-2. Determination of Normalizing Curve>

The normalizing curve generating portion 250 determines normalizing curve for each color component on the basis of the common reference density values (the highlight density value $D_{HX}$ and the shadow density value $D_{SX}$) (the process step S10).

Figure 13:
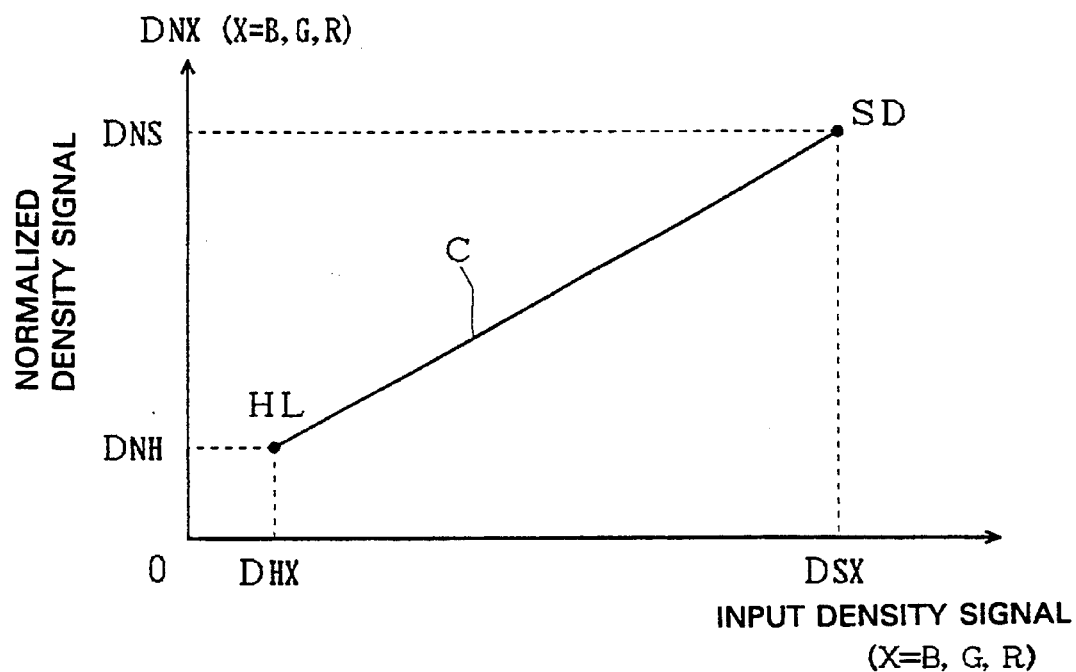
FIG. 13 is a diagram showing an example of normalizing curves.
Figure 14:
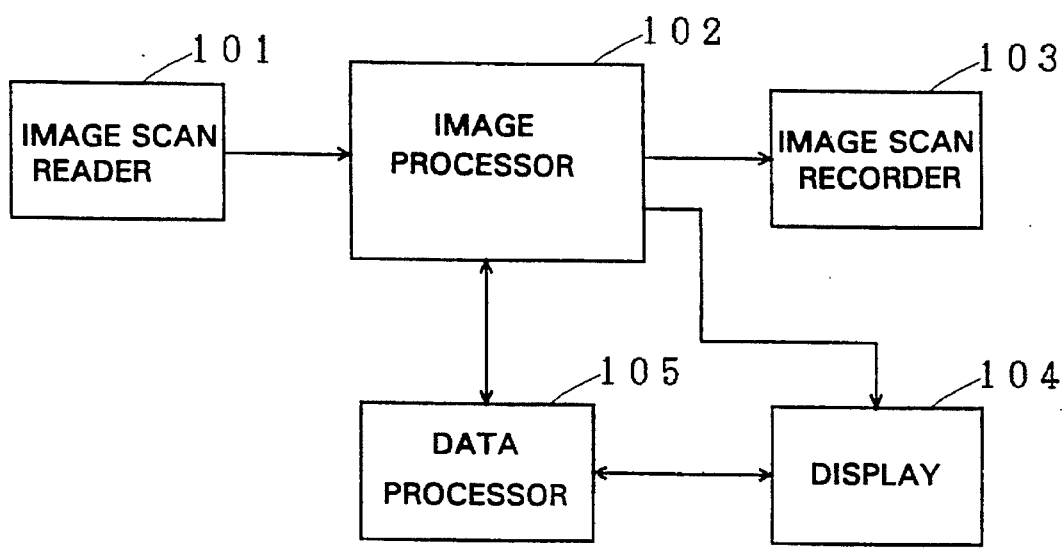
FIG. 14 is a diagram showing a conventional process scanner.

The determination is attained by providing the reference density values to the highlight density value $D_{HX}$ and the shadow density value $D_{SX}$ of the input density signals $D_X$ for defining the highlight point HL and the shadow point SD on the normalizing curve C of FIG. 13. After the determination of the normalizing curve C for each color component common to the all original films F1, F2 and F3, numerical data representing the respective normalizing curve C is generated and are stored in the LUT 202 of FIG. 1 for each color component. Then, as already described, the density signals $D_X$ for each pixel obtained in the regular scanning are normalized through the data stored in the LUT 202.

<C. Modification>

(1) In the process scanner 100 of FIG. 1, part or whole of the functions of the normalizing curve generator 210 may be attained by the CPU 17 and the memory 18 in the data processor 16.

(2) Although the normalizing process is conducted in the LUT 202 in the form of digital processing in the preferred embodiment, it may be replaced by analog processing using a function generator.

(3) In the preferred embodiment, the determination of the color separation rules are conducted by comparing the respective representative average density values $D_{AX}$ with the representative density values $D_{CX}$ in the comparator 238 and then determining highlight density value $D_{HX}$ and the shadow density value $D_{SX}$ in the common reference density value determining portion 240 on the basis of the representative density values $D_{CX}$. This process may be conducted in the structures illustrated in FIGS. 11 and 12.

Figure 11:
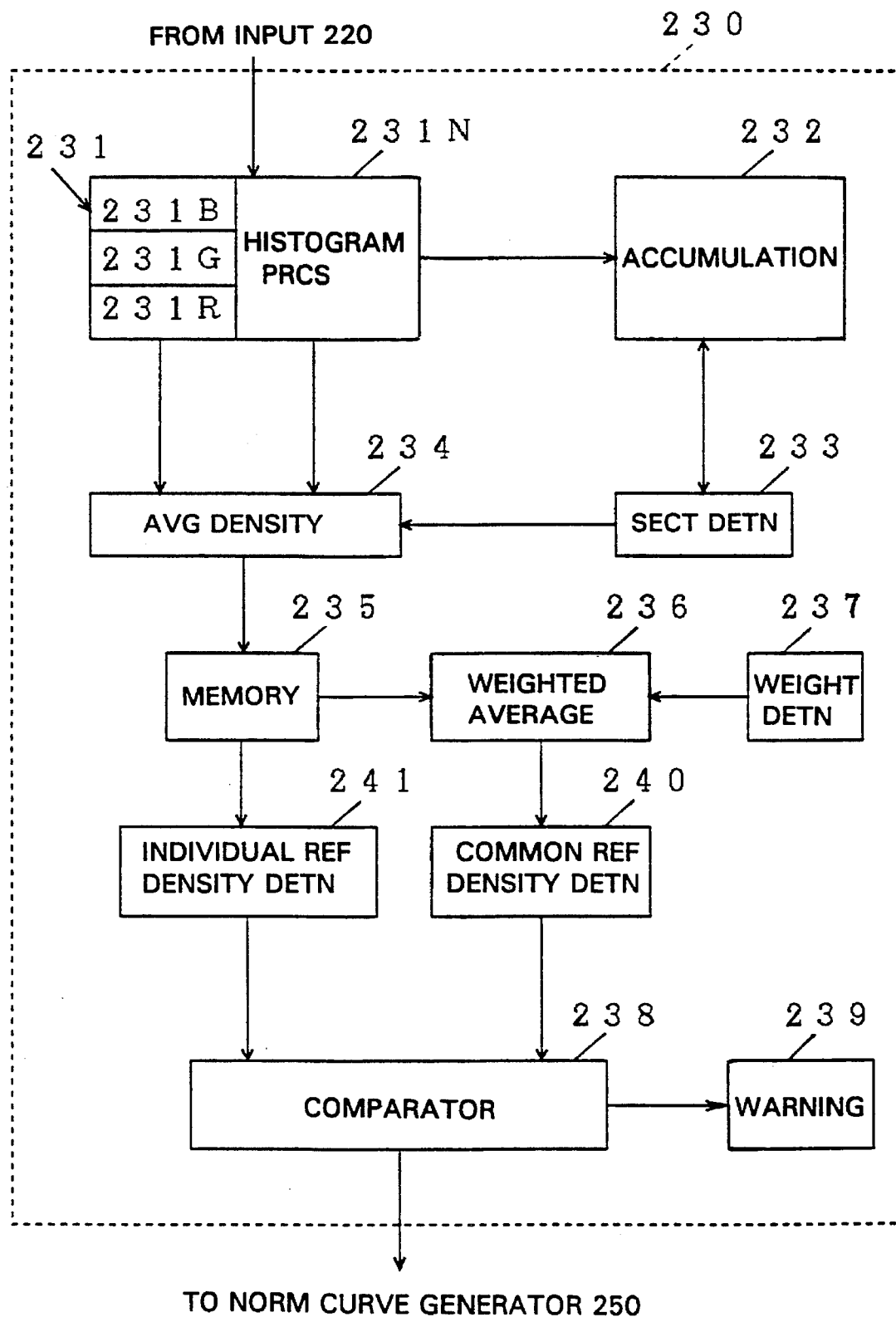
FIG. 11 is diagram showing is a modification of the color separation rule determining portion illustrated in FIG. 2.

In the structure shown in FIG. 11, the common reference density value determining portion 240 to determine the common reference density values is provided in the preceding stage of the comparator 238 while an individual reference density determining portion 241 for determining individual reference density values for each sample area $A_j$ is provided in the back stage of the memory 235. The common reference density values and the individual reference density values are compared with each other in the comparator 238. This modification is advantageous in that the reliability in the result of the comparison in the comparator 238 is increased since the comparison is performed after obtaining the respective reference density values.

Figure 12:
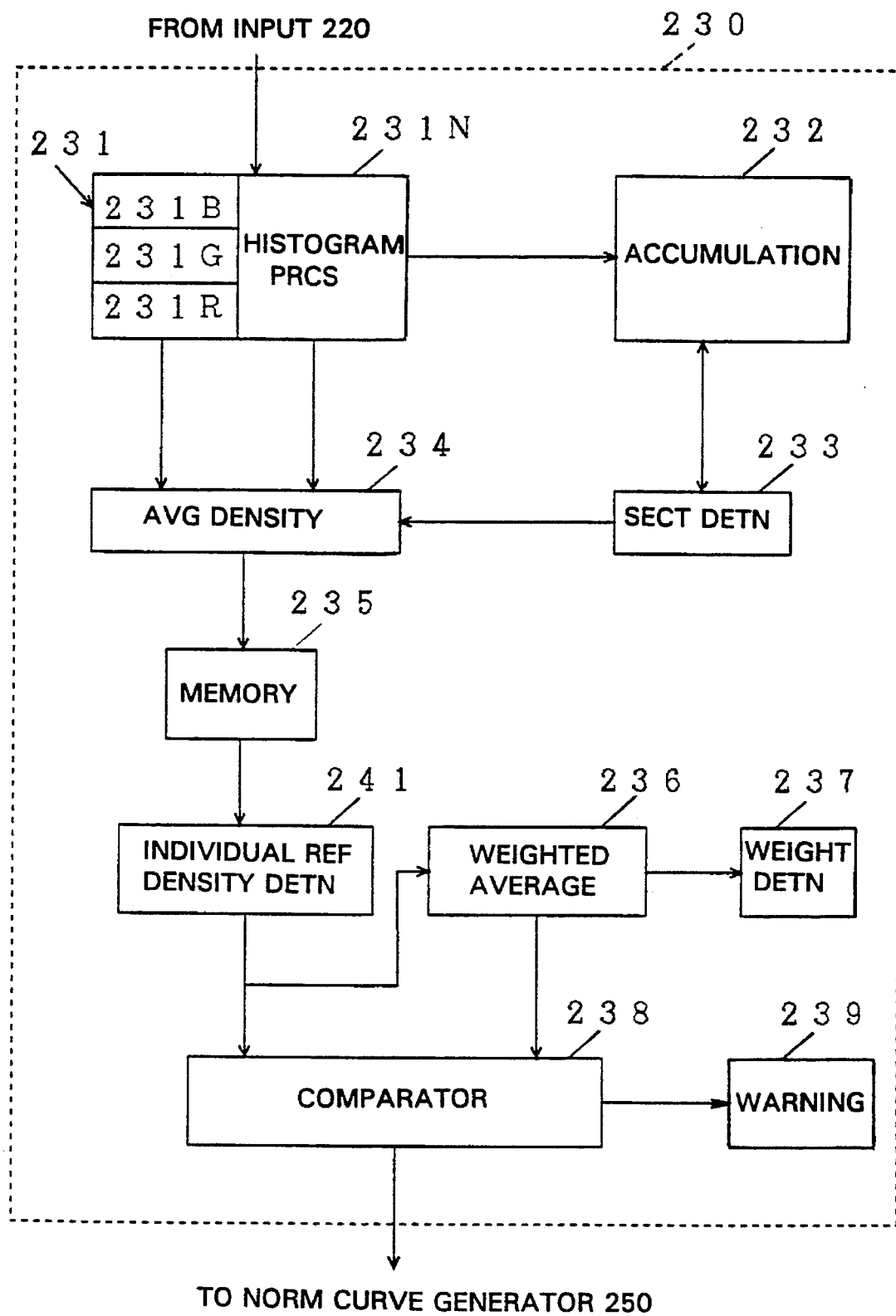
FIG. 12 is a diagram showing is another modification of the color separation rule determining portion illustrated in FIG. 2.

In the structure shown in FIG. 12, the common reference density value determining portion 240 of FIG. 11 is omitted and the individual reference density values obtained in the individual reference density determining portion 241 are transmitted to the weighted average calculator 236 for calculating a weighted average thereof to thereby obtain common reference density values. The comparator 238 compares the common reference density values with the individual reference density values. This modification is advantageous in that the circuit construction is simple.

(4) It is preferred that the highlight density values $D_{HX}$ and the shadow density values $D_{SX}$ as parameters of color separation rules are determined through a statistical process using histograms or the like as in the preferred embodiment. However, if a highlight point and a shadow point are found in each original film F1, F2, F3, the operator may designates these points and detect the densities at these points with a density detector. The detected densities are employed as the highlight density value and the shadow density value. The common reference density values are obtained by calculating weighted averages of the highlight density value and the shadow density value in the weighted average calculator 236.

Although the number of the objective original for which color separation rules are determined is thee in the example described, it may be an arbitrary plural number, e.g., two, four or more.

(5) In the preferred embodiment, the color separation rule is determined for each color component B, G, R. However, The present invention is applicable to determination of color separation rule for each color component Y, M, C, K in the color conversion into the Y, M, C and K halftone dot percentages in the first color computer 6. Further, it is also possible to determine a common color separation rule on the basis of an average density value of respective color components rather than that for each color component and then apply the common color separation rule to all color components for normalization.

(6) The present invention is applicable not only to determination of highlight and shadow densities as parameters for defining color separation rules but also to all types of parameters sufficient to define color separation rules. For example, the present invention can be applied to determination of a dummy shadow density value which is provided in addition to the highlight and shadow density values to correct uniform deviation of color tone only in the shadow part.

(7) The present invention can be applied to various image processing apparatuses for performing image processing such as color separation for original images.

While the invention has been shown and described in detail, the foregoing description is in all aspects illustrative and not restrictive. It is therefore understood that numerous modifications and variations can be devised without departing from the scope of the invention.

I claim:

1. A method of converting image signals representative of a plurality of original images into converted image signals, said method comprising steps of:

a) obtaining a plurality of parameter signals depending on density distributions of said plurality of original images, respectively;

b) averaging said plurality of parameter signals to obtain an averaged signal;

c) generating a common parameter signal common to said plurality of original images in response to said averaged signal;

d) generating a common signal-conversion characteristic in response to said common parameter signal; and e) converting each of said image signals through said signal-conversion characteristic to obtain said converted image signals, respectively; and wherein said step c) comprises steps of:

generating difference signals representative of differences between said common parameter signal and respective ones of said parameter signals, respectively;

comparing respective ones of said difference signals with a threshold signal; and generating a warning signal when at least one of said plurality of parameter signal is deviated from a difference range defined by said threshold.

2. The method of claim 1, wherein:

the step b) comprises the steps of:

determining respective weights of said plurality of parameter signals;

generating weight signals representative of said respective weights; and obtaining a weighted average of said plurality of parameter signals using said weight signals to thereby generate said averaged signal.

3. The method of claim 2, further comprising the steps of:

returning to the step d) to change respective weights of said plurality of parameter signals to other values when at least one of said plurality of parameter signals is deviated from said difference range in the step c); and generating a new averaged signal by using said other values of said weights.

4. The method of claim 3, wherein:

said plurality of original images are a plurality of color original images;

said common signal-conversion characteristic is generated for each color component.

5. The method of claim 4, wherein:

said plurality of parameter signals are obtained through statistical analysis of density distributions in sample areas designated on said plurality of original images, respectively.

6. An apparatus for converting image signals representative of a plurality of original images into converted image signals, said apparatus comprising:

a) parameter signal generator means for generating a plurality of parameter signals depending on density distributions of said plurality of original images, respectively;

b) averaging means for averaging said plurality of parameter signals to obtain an averaged signal;

c) common parameter generator means for generating a common parameter signal common to said plurality of original images in response to said averages signal;

d) conversion characteristic generator means for generating a common signal-conversion characteristic in response to said common parameter signal; and e) converter means for converting each of said image signals through said signal-conversion characteristic to obtain said converted image signals, respectively; and wherein said common parameter generator means comprises:

means for generating difference signals representative of differences between said common parameter signal and respective ones of said parameter signals, respectively;

means for comparing respective ones of said difference signals with a threshold signal; and mean for generating a warning signal when at least one of said plurality of parameter signals is deviated from a difference range defined by said threshold.

7. The apparatus of claim 6, wherein:

said averaging means comprises:

means for inputting respective weights of said plurality of parameter signals designated;

means for generating weight signals representative of respective weights; and means for obtaining a weighted average of said plurality of parameter signals using said weight signals to thereby generate said averaged signal.

8. A method of converting image signals representative of a plurality of original images into converted image signals, said method comprising steps of:

a) obtaining a plurality of parameter signals depending on density distributions of said plurality of original images, respectively;

b) averaging said plurality of parameter signals to obtain an averaged signal;

c) generating a common parameter signal common to said plurality of original images in response to said averaged signal;

d) generating a common signal-conversion characteristic in response to said common parameter signal; and e) converting each of said image signals through said signal-conversion characteristic to obtain said converted image signals, respectively; and wherein said step d) comprises steps of:

d-1) generating a reference signal in response to said common parameter signal;

d-2) generating a correction signal in response to a difference between said common parameter signal and said reference signal; and d-3) correcting said reference signal by said correction signal to generate said common signal-conversion characteristic.

9. The method of claim 8, wherein said plurality of original images are a plurality of color original images;

said common parameter signal is generated for each color component.

10. The method of claim 9, wherein the step d-1) comprises the steps of:

selecting one of common parameter signals for respective color components to generate a selected common parameter signal; and calculating an average of a predetermined signal and said selected common parameter signal to generate said reference signal.

11. The method of claim 10, wherein the step d-2) comprises the step of:

generating said correction signal for each color component; and the step d-3) comprises the step of:

correcting said reference signal by said correction signal for each color component to generate said common signal-conversion characteristic for each color component.

12. The method of claim 9, wherein the step d-1) comprises the steps of:

calculating an average of common parameter signals for respective color components to generate said reference signal.

13. An apparatus for converting image signals representative of a plurality of original images into converted image signals, said apparatus comprising:

a) parameter signal generator means for generating a plurality of parameter signals depending on density distributions of said plurality of original images, respectively;

b) averaging means for averaging said plurality of parameter signals to obtain an averaged signal;

c) common parameter generator means for generating a common parameter signal common to said plurality of original images in response to said averages signal;

d) conversion characteristic generator means for generating a common signal-conversion characteristic in response to said common parameter signal; and e) converter means for converting each of said image signals through said signal-conversion characteristic to obtain said converted image signals, respectively; and wherein said plurality of original images are a plurality of color original images;

said common signal-conversion characteristic is generated for each color component.

14. The apparatus of claim 13, wherein said plurality of parameter signals are obtained through statistical analysis of density distributions in sample areas designated on said plurality of original images, respectively.

15. An apparatus for converting image signals representative of a plurality of original images into converted image signals, said apparatus comprising:

a) parameter signal generator means for generating a plurality of parameter signals depending on density distributions of said plurality of original images, respectively;

b) averaging means for averaging said plurality of parameter signals to obtain an averaged signal;

c) common parameter generator means for generating a common parameter signal common to said plurality of original images in response to said averages signal;

d) conversion characteristic generator means for generating a common signal-conversion characteristic in response to said common parameter signal; and e) converter means for converting each of said image signals through said signal-conversion characteristic to obtain said converted image signals, respectively; and wherein said conversion characteristic generator means comprises:

d-1) reference signal generator means for generating a reference signal in response to said common parameter signal;

d-2) correction signal generator means for generating a correction signal in response to a difference between said common parameter signal and said reference signal; and d-3) means for correcting said reference signal by said correction signal to generate said common signal-conversion characteristic.

16. The apparatus of claim 15, wherein said plurality of original images are a plurality of color original images;

said common parameter signal is generated for each color component.

17. The apparatus of claim 16, wherein said reference signal generator means comprises:

means for selecting one of common parameter signals for respective color components to generate a selected common parameter signal; and means for calculating an average of a predetermined signal and said selected common parameter signal to generate said reference signal.

18. The apparatus of claim 17, wherein said correction signal generator means comprises:

means for generating said correction signal for each color component; and said correction signal generator means comprises:

means for correcting said reference signal by said correction signal for each color component to generate said common signal-conversion characteristic for each color component.

19. The apparatus of claim 16, wherein said reference signal generator means comprises:

means for calculating an average of common parameter signals for respective color components to generate said reference signal.

* * * * *